(12) United States Patent
Hu

(10) Patent No.: US 10,365,414 B2
(45) Date of Patent: Jul. 30, 2019

(54) LIGHT BEAM ADJUSTING DEVICE, OPTICAL ASSEMBLY AND LIGHTING AND/OR SIGNALING APPARATUS

(71) Applicant: VALEO LIGHTING HUBEI TECHNICAL CENTER Co. Ltd, Wuhan (CN)

(72) Inventor: Qiang Hu, Wuhan (CN)

(73) Assignee: Valeo Lighting Hubei Technical Center Co. Ltd, Wuhan (CN)

( * ) Notice: Subject to any disclaimer, the term of this patent is extended or adjusted under 35 U.S.C. 154(b) by 0 days.

(21) Appl. No.: 15/821,928

(22) Filed: Nov. 24, 2017

(65) Prior Publication Data
US 2018/0143355 A1    May 24, 2018

(30) Foreign Application Priority Data
Nov. 24, 2016    (CN) .......................... 2016 1 1050816

(51) Int. Cl.
| | | |
|---|---|---|
| F21V 7/00 | (2006.01) |
| G02B 3/10 | (2006.01) |
| F21V 5/04 | (2006.01) |
| F21V 13/04 | (2006.01) |
| G02B 27/30 | (2006.01) |
| G02B 3/08 | (2006.01) |
| F21S 43/20 | (2018.01) |
| F21S 41/20 | (2018.01) |

(52) U.S. Cl.
CPC .............. *G02B 3/10* (2013.01); *F21V 5/045* (2013.01); *F21V 7/0025* (2013.01); *F21V 7/0091* (2013.01); *F21V 13/04* (2013.01); *G02B 3/08* (2013.01); *G02B 27/30* (2013.01); *F21S 41/20* (2018.01); *F21S 43/26* (2018.01)

(58) Field of Classification Search
CPC ............................... G02B 26/123; G02B 6/32
USPC ..................................................... 362/309, 84
See application file for complete search history.

(56) References Cited

U.S. PATENT DOCUMENTS 5,504,544 A * 4/1996 Dreyer ..................... G02B 5/04
353/38
2003/0215938 A1    11/2003 Sandell et al.

FOREIGN PATENT DOCUMENTS

| EP | 0458508 | 11/1991 |
| JP | H04-316010 | 11/1992 |
| WO | WO 2008/021082 | 2/2008 |

(Continued)

OTHER PUBLICATIONS

European Search Report dated Feb. 2, 2018, in European Patent Application No. 17 20 1193.4.

(Continued)

*Primary Examiner* — Jamara A Franklin
(74) *Attorney, Agent, or Firm* — Oblon, McClelland, Maier & Neustadt, L.L.P.

(57) ABSTRACT

The present disclosure provides a light beam adjusting device, an optical assembly and a lighting and/or signaling apparatus. The light beam adjusting device includes: a light collimating portion arranged to collimate a light beam; and a multi-focal converging portion arranged to converge the collimated light beam, the multi-focal converging portion including two or more converging surfaces, wherein at least two of the two or more converging surfaces have focal points separated spatially from each other.

20 Claims, 9 Drawing Sheets

(56) References Cited

FOREIGN PATENT DOCUMENTS

WO    WO 2011/079856    7/2011

OTHER PUBLICATIONS

European Search Opinion dated Feb. 2, 2018, in European Patent Application No. 17 20 1193.4.

* cited by examiner

LIGHT BEAM ADJUSTING DEVICE, OPTICAL ASSEMBLY AND LIGHTING AND/OR SIGNALING APPARATUS

BACKGROUND OF THE DISCLOSURE

Field of the Disclosure

The present application relates to the lighting and signaling field, and in particular to a light beam adjusting device, an optical assembly and a lighting and/or signaling apparatus including the optical assembly.

Description of the Related Art

With development of technology and progress of society, a lighting or signaling apparatus that can only provide a function of illumination or a function of signal indicator will not satisfy the requirements of the people any longer. Instead, more and more customized applications of the lighting or signaling apparatus (for example a vehicle lamp for an automobile vehicle) have been proposed, therefore it needs to provide more diverse patterns and lit aspects of the light beam. In this case, a single light source often cannot satisfy the requirements. Thus, in order to achieve the diverse lit aspects (such as diverse depths of field, plural spots), in the prior art, more light sources are often needed to be provided. Thus, more light sources typically will occupy more space. It will affect the design space of lamps adversely and limit style design.

SUMMARY

The present application is intended to provide a light beam adjusting device that can focus a light beam at a plurality of focal points to use a single light source to provide a lit aspect similar to that of a combination of a plurality of light sources.

The present application is also intended to provide an optical assembly including the light beam adjusting device and a lighting and/or signaling apparatus.

An embodiment of present application provides a light beam adjusting device including: a light collimating portion arranged to collimate a light beam; and a multi-focal converging portion arranged to converge the collimated light beam, the multi-focal converging portion including two or more converging surfaces, wherein at least two of the two or more converging surfaces have focal points separated spatially from each other.

In an embodiment, all of focal points of the two or more converging surfaces are arranged in the same axis of the multi-focal converging portion.

In an embodiment, the two or more converging surfaces are arranged in sequence along a radial direction of the multi-focal converging portion.

In an embodiment, all of focal points of the two or more converging surfaces are arranged in the same plane perpendicular to an axis of the multi-focal converging portion.

In an embodiment, all of peaks of the two or more converging surfaces are arranged in the same plane perpendicular to the axis of the multi-focal converging portion.

In an embodiment, all of focal points of the two or more converging surfaces are arranged in at least two different planes perpendicular to an axis of the multi-focal converging portion respectively.

In an embodiment, all of peaks of the two or more converging surfaces are arranged in the at least two different planes perpendicular to the axis of the multi-focal converging portion respectively.

In an embodiment, the light collimating portion and the multi-focal converging portion are formed integrally as one single part, and the light collimating portion is formed at a light incidence side of the single part and the multi-focal converging portion is formed at a light exit side of the single part.

In an embodiment, the light beam adjusting device further includes a reflector arranged to reflect a light emitted from the two or more converging surfaces.

In an embodiment, the two or more converging surfaces are arranged at a side surface of the single part, and the single part further comprises a reflective face arranged to direct the light beam collimated by the light collimating portion to the two or more converging surfaces, the reflective face being arranged at a side of the single part opposite to the light collimating portion.

In an embodiment, the light beam adjusting device further includes a plurality of mirrors arranged outside the side surface of the single part and arranged in sequence from near to far with respect to the side surface of the single part, to reflect the light beam converged by the two or more converging surfaces respectively.

In an embodiment, the light collimating portion comprises a first light incident face, a second light incident face and a totally reflective face, and wherein the first light incident face is arranged at an intermediate position of the light collimating portion to collimate a central portion of the light beam; the second light incident face is arranged outside the first light incident face in a radial direction to direct a peripheral portion of the light beam to the totally reflective face which is arranged outside the second light incident face in a radial direction to collimate the portion of the light beam incident from the second light incident face.

An embodiment of the present application provides an optical assembly comprising: a light source arranged to emit a light beam; and the light beam adjusting device as described in any one of the above embodiments.

In an embodiment, the optical assembly further includes a light guide device which has a light incidence end arranged toward the two or more converging surfaces and arranged to receive the light emitted from the two or more converging surfaces.

An embodiment of the present application also provides a lighting and/or signaling apparatus, including the optical assembly as described in any one of the above embodiments.

With the light beam adjusting device and the optical assembly as described in any one of the above embodiments, the intensity distribution of a light beam emitted from a single light source can be converted by a plurality of converging surfaces having different focal points into an intensity distribution similar to that of the light beams emitted from a plurality of light sources, so as to improve the lit aspect of the illuminating and/or signaling light of a vehicle lamp.

DETAILED DESCRIPTION OF PREFERRED EMBODIMENTS

Figure 1:
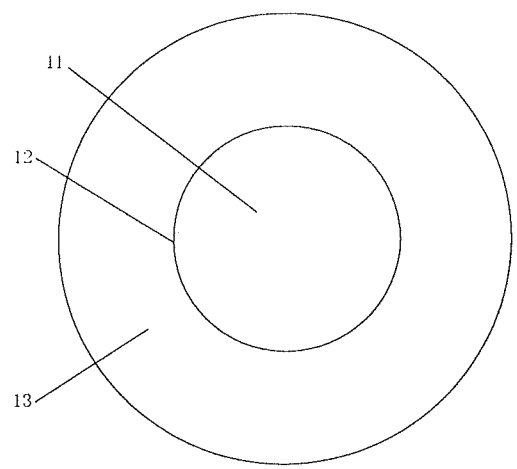
FIG. 1 is a schematic view showing a light incident direction of a light beam adjusting device according to an embodiment of the present application.

Embodiments of the present application will below be explained in details by ways of examples with reference to the accompanying drawings. Throughout the description, same or similar reference numerals represent same or similar parts. The following description of the embodiments with reference to the drawings is intended to explain the general inventive concept of the present application, instead of limiting the present invention.

In accordance with a general concept of the present application, it provides a light beam adjusting device including: a light collimating portion arranged to collimate a light beam; and a multi-focal converging portion arranged to converge the collimated light beam, the multi-focal converging portion including two or more converging surfaces, wherein at least two of the two or more converging surfaces have focal points separated spatially from each other.

In addition, in the following detailed description, for purposes of explanation, numerous specific details are set forth in order to provide a thorough understanding of the disclosed embodiments. It will be apparent, however, that one or more embodiments may be practiced without these specific details.

Figure 2:
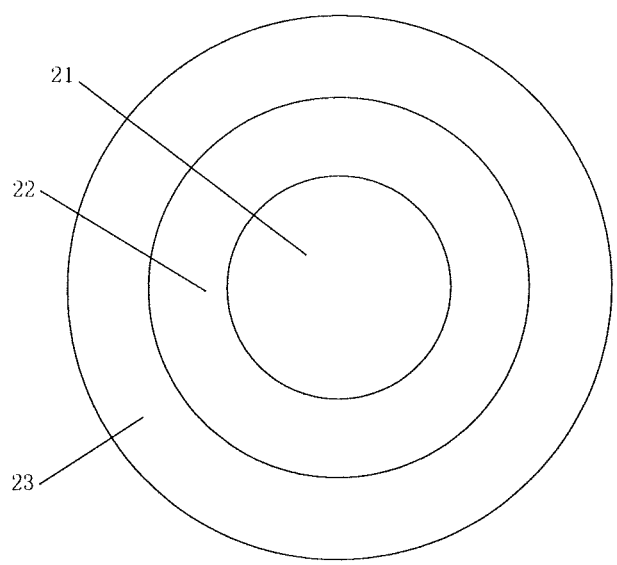
FIG. 2 is a schematic view showing a light exit direction of the light beam adjusting device shown in FIG. 1.
Figure 3:
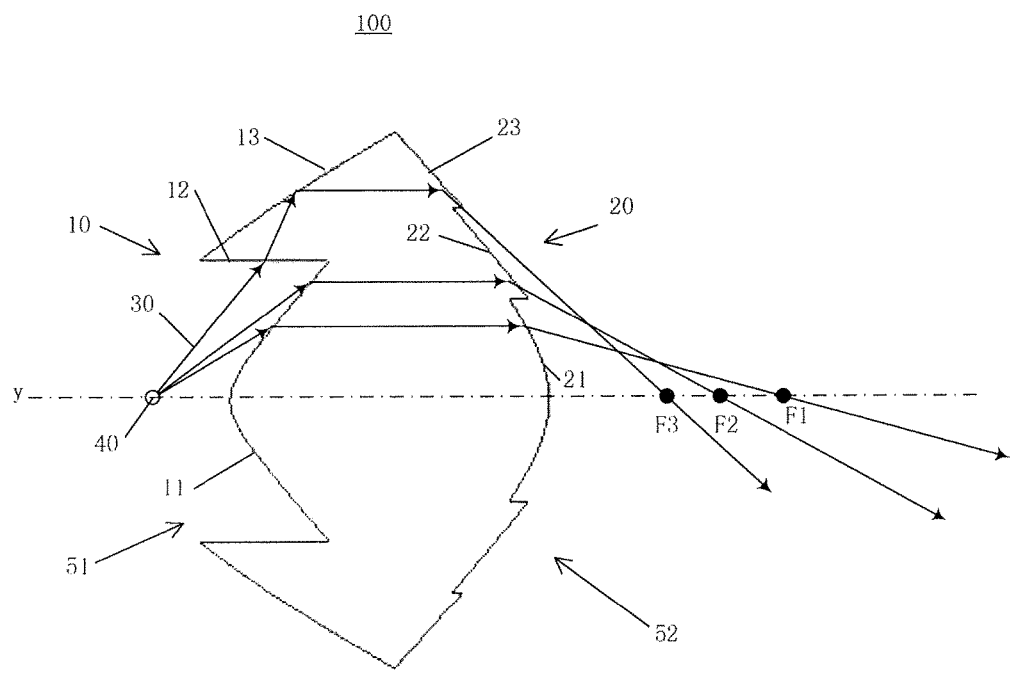
FIG. 3 is a schematic side cross sectional view of the light beam adjusting device shown in FIG. 1.

FIGS. 1-3 are schematic views showing a light beam adjusting device 100 according to an embodiment of the present application. The light beam adjusting device 100 includes: a light collimating portion 10 and a multi-focal converging portion 20. The light collimating portion 10 is arranged to collimate a light beam 30 (for example, emitted from a light source 40). The multi-focal converging portion 20 is arranged to converge the collimated light beam. The multi-focal converging portion 20 includes three converging surfaces 21, 22, 23. The three converging surfaces 21, 22, 23 have focal points separated spatially from each other. As illustrated in FIG. 3, these focal points are located at three points F1, F2 and F3. In this way, different portions of a light beam 30 may be converged at different converging points by the three different converging surfaces 21, 22, 23, respectively. In this case, the focal points F1, F2 and F3 may be considered as virtual source points. In other words, when viewed in a direction opposite to the light exit direction of the light beam adjusting device 100 (i.e., viewed from right to left at the right side of F3 in the example shown in FIG. 3), the light beam 30 seems to be converted into a combination of light beams emitted from focal points (or virtual source points) F1, F2 and F3 after it passes through the light beam adjusting device 100. Thus, the light beam adjusting device 100 can provide lit aspect similar to that of a combination of a plurality of point light sources by a single point light source.

In an embodiment of the present application, the number of the converging surfaces is not limited to three. For example, two or more than three converging surfaces may be provided. At least two of these converging surfaces have focal points separated spatially from each other. In this way, it may achieve the lit aspect similar to that of the combination of a plurality of point light sources.

In the example shown in FIG. 3, all of focal points F1, F2, F3 of the three converging surfaces 21, 22, 23 are arranged in the same axis y of the multi-focal converging portion 20. The converging surfaces 21, 22, 23 may be arranged in sequence in a radial direction of the multi-focal converging portion 20. In this way, the focal points of the converging surfaces 21, 22, 23 may be separated from each other in the axis y by adjusting the shape and position of each of the converging surfaces 21, 22, 23. In the example shown in FIG. 2, the converging surfaces 21, 22, 23 are shown as concentric circles and circular rings in shape. In this way, it is easy to arrange the focal points of the three converging surfaces 21, 22, 23 in a same axis. However, the embodiments of the present application will not be limited to such an arrangement, the converging surfaces 21, 22, 23 may have other forms or structures as long as it allows the focal points of the three converging surfaces 21, 22, 23 to be in the same axis.

In the above embodiment in which the focal points of the converging surfaces are located in the same axis, the lit aspect of the single point light source may be converted into a light aspect similar to that of the combination of the plurality of point light sources located in the same axis.

Figure 8:
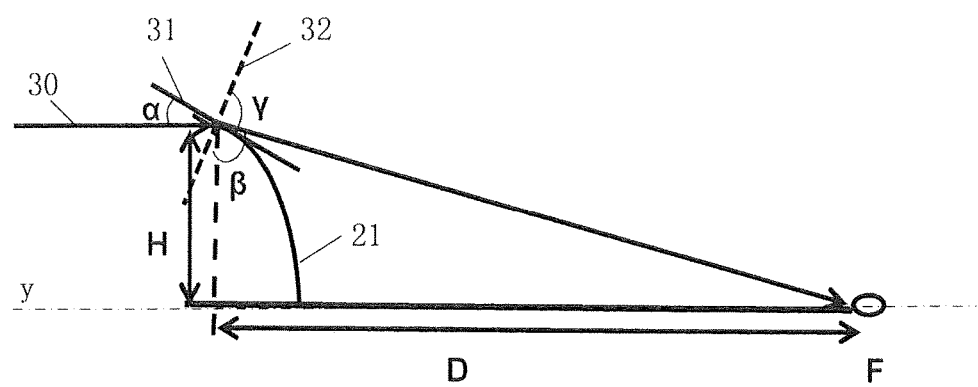
FIG. 8 is a schematic view showing work principle of a converging surface of the light beam adjusting device according to an embodiment of the present application.

FIG. 8 shows schematically converging effects of the light beam 30 at any position on the converging surfaces 21, 22, 23. In FIG. 8, the numeral "31" represents a tangent line to the converging surface 21, 22, 23 at a position and the numeral "32" represents a normal line to the converging surface 21, 22, 23 at the position. α is an angle between an incident light and the tangent line 31 at the position. β is an angle between an emergent light and a plane perpendicular to the axis y of the multi-focal converging portion 20 at the position. γ is an angle between an emergent light and the normal line 32 at the position. N1 is a refractive index of a medium at an inside of the converging surface 21, 22, 23 (i.e., the material medium of the multi-focal converging portion 20, such as PMMA (refractive index of 1.49) or polycarbonate (refractive index of 1.586)). N2 is a refractive index of a medium at an outside of the converging surface 21, 22, 23 (i.e., the external environmental medium, such as air). H is a height between this position and the axis y of the multi-focal converging portion 20. D is a distance between this position and the focal point F along the axis y. In practice, H and D may be given as requirements of design. The angles α, β and γ meet the following equation:

$$\begin{cases} \beta = \arctan(D/H) \\ N1 \times \sin(90° - \alpha) = N2 \times \sin\gamma \\ \alpha + \gamma = 180° - \beta \end{cases} \quad \text{(Eq. 1)}$$

From the above Eq. 1, the angles α, β and γ can be obtained. That is, the respective angles of desired incident light and emergent light with respect to the tangent line 31 and the normal line 32 can be obtained. In this way, the surface shapes of the converging surface 21, 22, 23 at respective positions can be determined. As an example, for PMMA, the angle α may be in a range between 47 degrees and 60 degrees; for polycarbonate, the angle α may be in a range between 50 degrees and 65 degrees. As an example, H may be in a range between 3 mm and 10 mm, such as 5 mm. D may be in a range between 6 mm and 20 mm, such as 9.7 mm.

Figure 4:
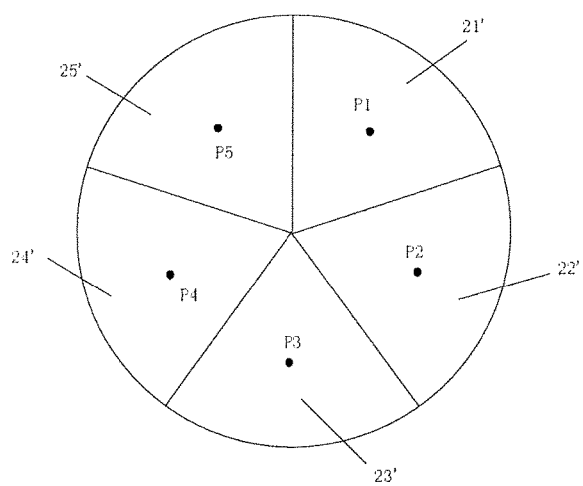
FIG. 4 is a schematic view showing a light exit direction of a light beam adjusting device according to another embodiment of the present application.
Figure 5:
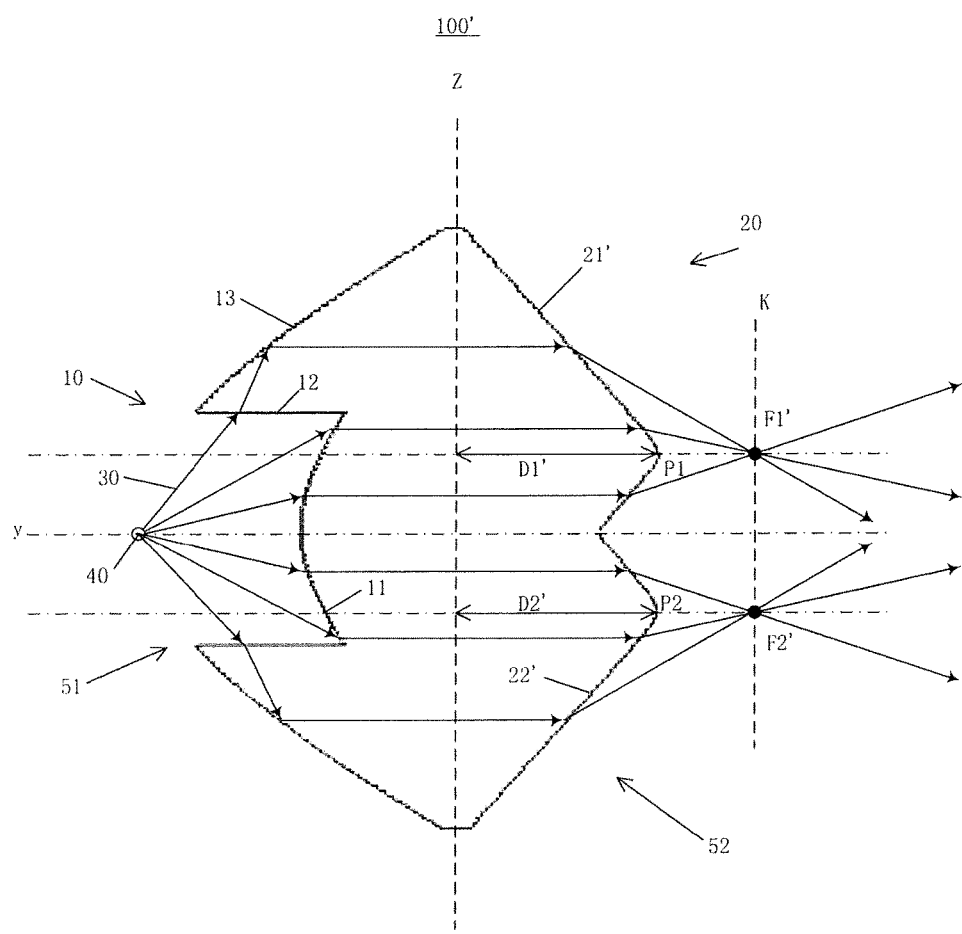
FIG. 5 is a schematic side cross sectional view of the light beam adjusting device shown in FIG. 4.

FIG. 4 and FIG. 5 show schematically a light beam adjusting device 100' according to another embodiment of the present application. The embodiment is distinguished from those shown in FIGS. 1-3 in that focal points F1', F2' of the converging surfaces 21', 22', 23', 24', 25' are arranged in the same plane K perpendicular to the axis y of the multi-focal converging portion 20. (For the sake of clarity, FIG. 5 only shows focal points of two converging surfaces 21', 22'. However, the focal points of the converging surfaces 23', 24', 25' may also be arranged in the plane K). As an example, the converging surfaces 21', 22', 23', 24', 25' may have peaks (i.e., the highest points projecting from the respective converging surfaces 21', 22', 23', 24', 25') P1, P2, P3, P4, P5. All of peaks P1, P2, P3, P4, P5 of the respective converging surfaces 21', 22', 23', 24', 25' may also be arranged in the same plane perpendicular to the axis y of the multi-focal converging portion 20.

For example, as shown in FIG. 5, the distance D1' between the peak P1 and a plane Z perpendicular to the axis y is equal to the distance D2' between the peak P2 and the plane Z perpendicular to the axis y, that is, these peaks are located in the same plane perpendicular to the axis y of the multi-focal converging portion 20. As an example, in the example shown in FIG. 4, the converging surfaces 21', 22', 23', 24', 25' are shown to occupy the same area of circular sector respectively. By means of such structure, it is easy to arrange the focal points of the converging surfaces 21', 22', 23', 24', 25' in the same plane. However, embodiments of the present application are not limited to this. Alternatively, other forms of the converging surfaces 21', 22', 23', 24', 25' may also be applied as long as the focal points of the converging surfaces 21', 22', 23', 24', 25' can be arranged in the same plane perpendicular to the axis y of the multi-focal converging portion 20.

In the above embodiment in which the focal points of the converging surfaces are located in the same plane, the lit aspect of the single point light source may be converted into a light aspect similar to that of the combination of the plurality of point light sources located in the same plane.

Figure 6:
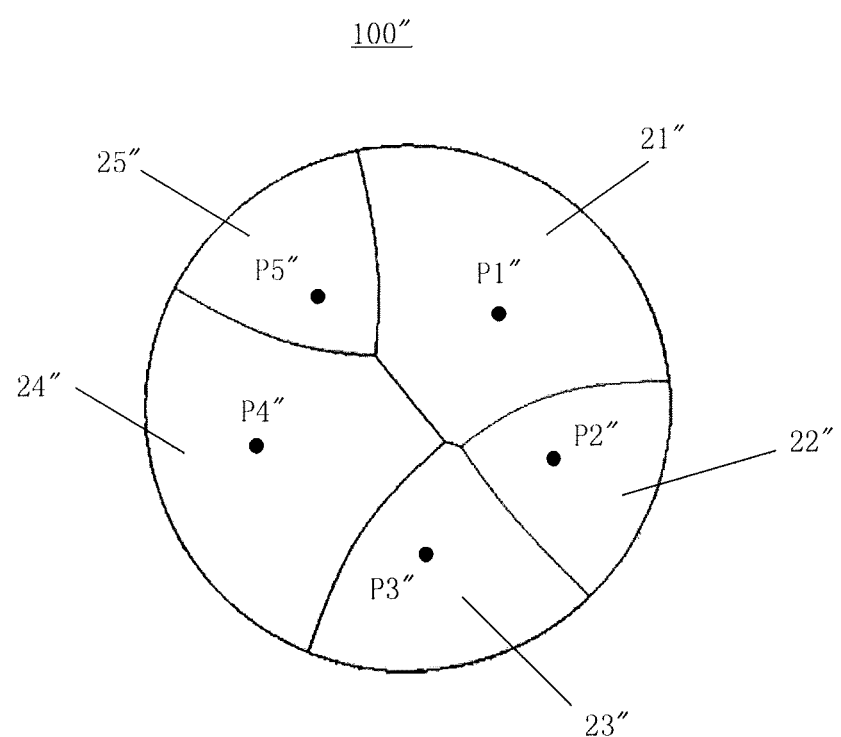
FIG. 6 is a schematic view showing a light exit direction of a light beam adjusting device according to a further embodiment of the present application.
Figure 7:
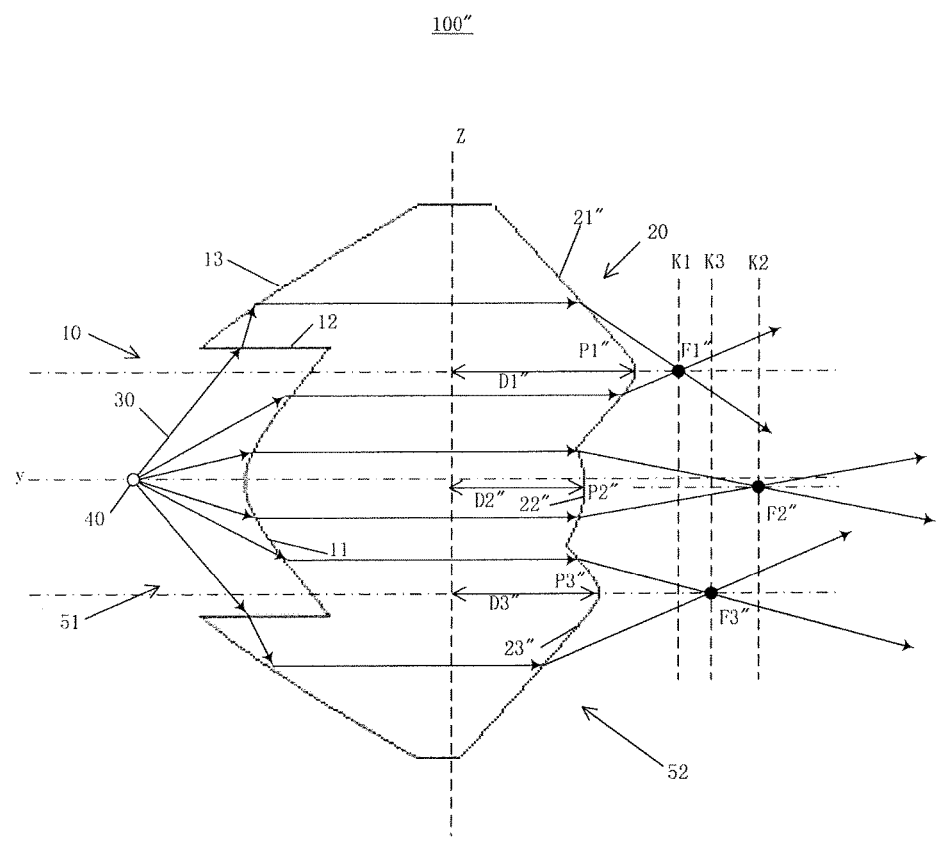
FIG. 7 is a schematic side cross sectional view of the light beam adjusting device shown in FIG. 6.

FIG. 6 and FIG. 7 show schematically a light beam adjusting device 100" according to a further embodiment of the present application. The embodiment is distinguished from those shown in FIGS. 1-3 in that focal points of the converging surfaces 21", 22", 23", 24", 25" are arranged in two different planes perpendicular to the axis y of the multi-focal converging portion 20. That is, they are not arranged in the same plane perpendicular to the axis y of the multi-focal converging portion 20. (For the sake of clarity, FIG. 7 only shows focal points of three converging surfaces 21", 22", 23" and focal points of the converging surfaces 24", 25" are not shown.) As an example, the converging surfaces 21", 22", 23", 24", 25" may have peaks (i.e., the highest points projecting from the respective converging surfaces 21", 22", 23", 24", 25") P1", P2", P3", P4", P5". All of these peaks P1", P2", P3", P4", P5" of the respective converging surfaces 21", 22", 23", 24", 25" may also be arranged in at least two different planes perpendicular to the axis y of the multi-focal converging portion 20. That is, these peaks P1", P2", P3", P4", P5" are also not located in the same plane.

For example, as shown in FIG. 7, any one of the distance D1 between the peak P1" and a plane Z perpendicular to the axis y, the distance D2 between the peak P2" and the plane Z perpendicular to the axis y and the distance D3 between the peak P3" and the plane Z perpendicular to the axis y is not equal to the other two of them. The focal points F1", F2", F3" of the converging surfaces 21", 22", 23" are arranged in planes K1, K2, K3 perpendicular to the axis y of the multi-focal converging portion 20, respectively. And as shown in FIG. 6, the distances between these peaks P1", P2", P3", P4", P5" and the axis y may also be arranged in any manner as requirement of design. Such arrangement provides more flexible design for configuration of the focal points of the light beam (or virtual source points). In practice, the number and shape of the converging surfaces may be designed freely as requirement of the design.

In the above embodiment in which the focal points of the converging surfaces are located in different planes, the lit aspect of the single point light source may be converted into a light aspect similar to that of the combination of the plurality of point light sources arranged in any manner. It may provide more freedom for the design of the lit aspect of lamps.

In the above three types of embodiments, i.e, focal points in the same axis, focal points in the same plane and focal points in different planes, the arrangement of the focal points in the same axis can provide the maximum optical efficiency (for example up to 90%) for the light beam adjusting device 100, 100', 100" while the arrangement of the focal points in the same plane and the arrangement of the focal points in different planes may provide off-axis illumination effects.

In the above examples given by FIG. 4 to FIG. 7, the surface shapes of the converging surfaces 21', 22', 23', 24', 25', 21", 22", 23", 24", 25" may be determined by means of the method shown in FIG. 8. The details will be omitted herein.

Figure 11A:
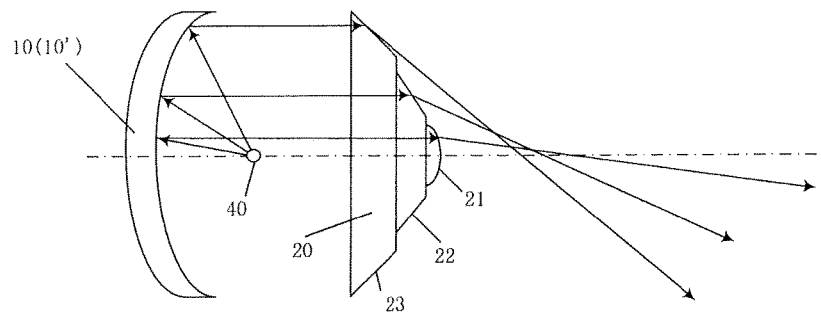
FIG. 11a and FIG. 11b are schematic views showing a light beam adjusting device according to still yet another embodiment of the present application.
Figure 11B:
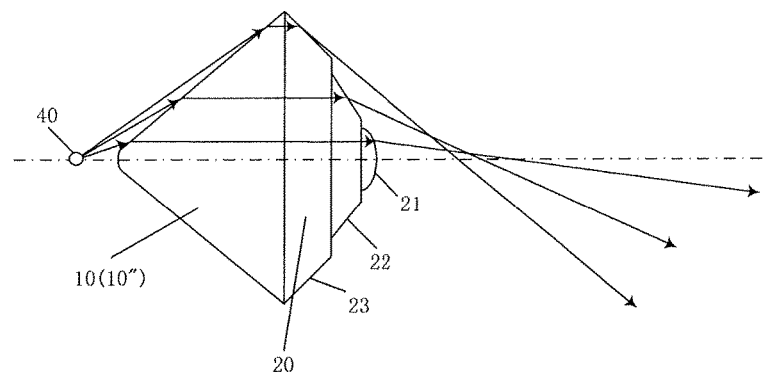

In an embodiment of the present application, as shown in FIG. 3, the light collimating portion 10 may for example have a first light incident face 11, a second light incident face 12 and a totally reflective face 13. The first light incident face 11 is located in an intermediate position of the light collimating portion 10 and is configured to collimate a central portion of the light beam 30. The second light incident face 12 is arranged outside the first light incident face 11 in a radial direction and configured to direct (for example deflect) a peripheral portion of the light beam 30 to the totally reflective face 13. The totally reflective face 13 is arranged outside the second light incident face 12 in a radial direction and configured to collimate the portion of the light beam incident from the second light incident face 12. Such structure of the light collimating portion 10 can allow the position of the light source 40 to be closer to the light collimating portion 10, so as to improve the optical efficiency and reduce the size of the lamps. However, the embodiments of the present application are not limited to this. Alternatively, any other forms of the light collimating portion 10 may also be applied. For example, the reflective collimator 10' shown in FIG. 11a (e.g., it has a curve surface shape such as paraboloid) and the transmissive collimator 10" shown in FIG. 11b may be used as the light collimating portion 10. It should be noted that, in the embodiment shown in FIG. 11a, the light source 40 may be arranged between the light collimating portion 10 and the multi-focal converging portion 20.

In an example, as shown in FIGS. 1-7, the light collimating portion 10 and the multi-focal converging portion 20 may be formed integrally as one single part. The light collimating portion 10 is formed at a light incidence side 51 of the single part and the multi-focal converging portion 20 is formed at a light exit side 52 of the single part. Forming the light collimating portion 10 and the multi-focal converging portion 20 as one integral part may reduce the space that the light beam adjusting device occupies and save the costs and reduce work load of calibrating optical paths. As an example, as shown in FIG. 5 and FIG. 7, in the axial direction of the multi-focal converging portion 20, the thickness of the multi-focal converging portion 20 (for example the maximum height of the peaks of the converging surfaces) may be less than the thickness of the light collimating portion 10, so as to further reduce the size of the single part.

Figure 9:
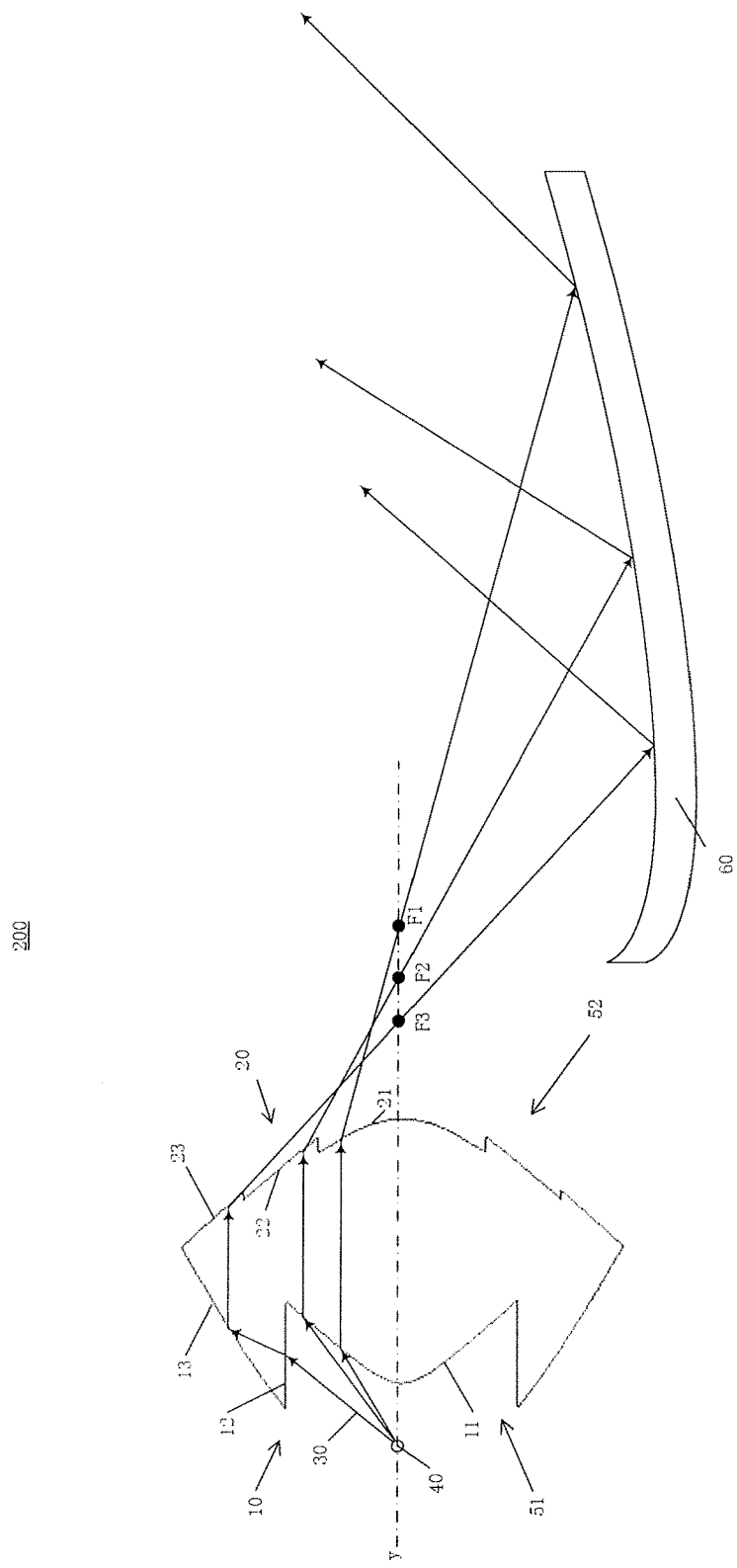
FIG. 9 is a schematic view showing a light beam adjusting device according to a yet further embodiment of the present application.

In an embodiment, as shown in FIG. 9, the light beam adjusting device 200 may further include a reflector 60, for example, a planar mirror or a curved mirror (e.g., it has a shape such as paraboloid, ellipsoid, hyperboloid) arranged to reflect a light emitted from the converging surfaces 21, 22, 23. As illustrated in FIG. 9, the reflector 60 may be arranged outside the multi-focal converging portion 20. Due to difference in focal points of the converging surfaces 21, 22, 23, the light reflected by the reflector 60 may provide different depth of field.

Figure 10:
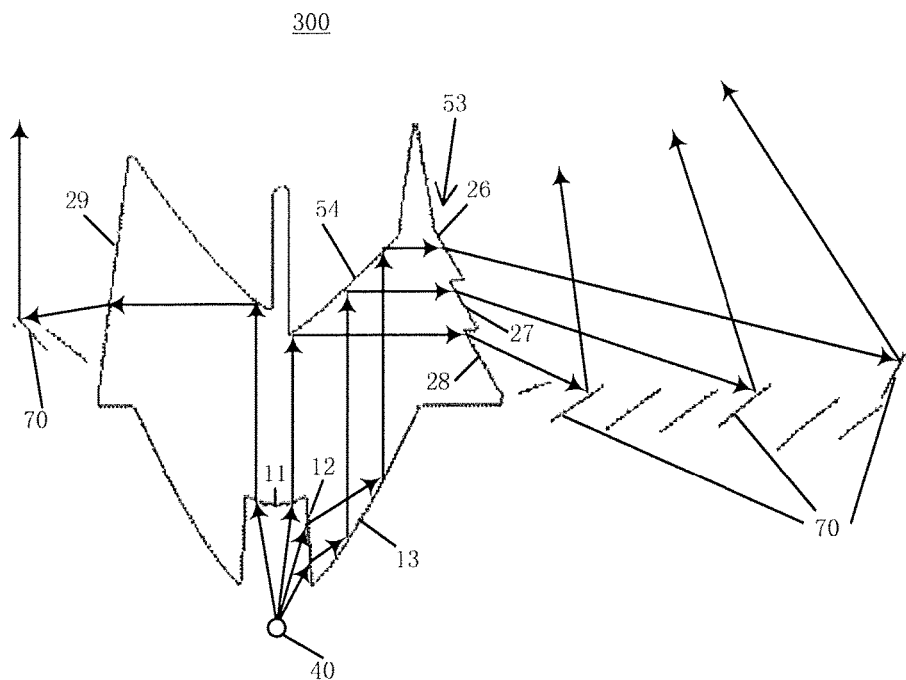
FIG. 10 is a schematic view showing a light beam adjusting device according to a still further embodiment of the present application.

FIG. 10 shows a light beam adjusting device 300 according to still further embodiment of the present application. In the light beam adjusting device 300, the converging surfaces 26, 27, 28 are arranged at a side surface 53 of the single part formed integrally by the light collimating portion 10 and the multi-focal converging portion 20. The single part further includes a reflective face 54 arranged to direct the light beam collimated by the light collimating portion 10 to the converging surfaces 26, 27, 28. The reflective face 54 is arranged at the side of the single part opposite to the light collimating portion 10. By means of the reflective face 54, the light converged by the converging surfaces 26, 27, 28 is directed towards periphery of the light beam adjusting device 300 to enlarge the propagation range.

As an example, the light beam adjusting device 300 may further include a plurality of mirrors 70 arranged outside the side surface 53 of the single part and arranged in sequence from near to far with respect to the side surface 53 of the single part, to reflect the light beam converged by these converging surfaces 26, 27, 28 respectively. Since the converging surfaces 26, 27, 28 have different focal points respectively, the light reflected by the plurality of mirrors 70 may provide more diverse lit aspect. The orientations of the plurality of mirrors 70 may be provided as requirement of the design of optical paths, for example, the plurality of mirrors 70 may have the same orientation or different orientations from each other, as shown in FIG. 10. FIG. 10 also shows another surface 29 in opposite to the converging surfaces 26, 27, 28. The surface 29 may have different converging characteristic from those of the converging surfaces 26, 27, 28, such that the light emitted from the light source 40 can have different travel directions or converging degrees on different sides of the light beam adjusting device 300. It may provide more flexibility for the design of the optical paths.

Figure 12:
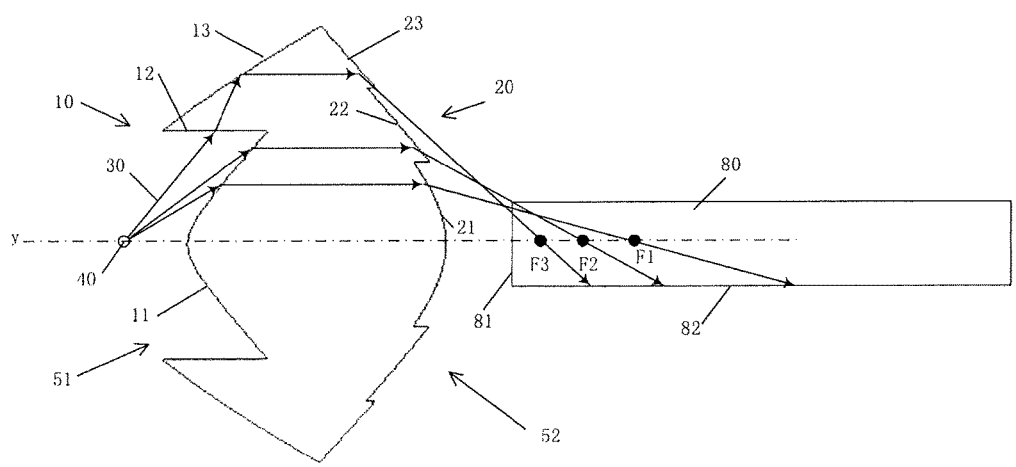
FIG. 12 and FIG. 13 are schematic views showing an optical assembly including a light guide device according to an embodiment of the present application.

An embodiment of the present application also provides an optical assembly 500. The optical assembly 500 includes: a light source arranged to emit a light beam 30; and the light beam adjusting device 100, 100', 100", 200, 300 as described in any one of the above embodiments. As an example, as shown in FIG. 12, the optical assembly 500 may further include a light guide device 80 which has a light incidence end 81 arranged toward the converging surfaces 21, 22, 23 and arranged to receive the light emitted from the converging surfaces 21, 22, 23.

Figure 13:
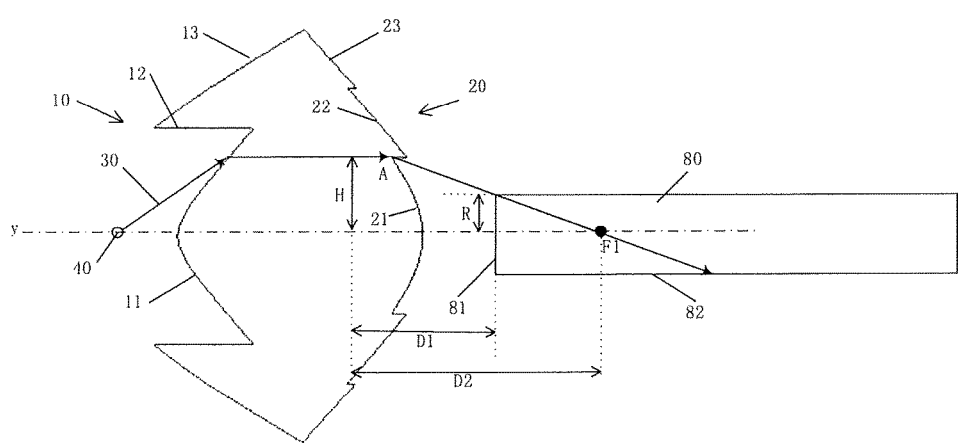

FIG. 13 shows an exemplary structure of the light guide device 80. In this example, the light guide device 80 has an axis coinciding with the axis of the light beam adjusting device 100. It is assumed that R is the radius of the end face of the light incident end 81 of the light guide device 80, F1 is a focal point of an optional converging surface 21, D1 is a distance between a position A on the converging surface 21 and the light incident end 81 in an axial direction of the light beam adjusting device 100, D2 is a distance between the position A on the converging surface 21 and the focal point F1 in the axial direction of the light beam adjusting device 100, and H is the height of the position A with respect to the axis of the light beam adjusting device 100. In order that the light from the position A can enter the light incident end 81 of the light guide device 80, it needs to satisfy:

$$R \geq (H/D2) \times (D2-D1) \quad \text{(Eq. 2)}$$

In practice, the radius R of the end face of the light incident end 81 of the light guide device 80 may be set depending on the positions of point on the converging surfaces 21, 22, 23. In order that all of lights from different converging surfaces can enter the light guide device 80, it is desired that there are a plurality of points on the converging surfaces 21, 22, 23 located in the range of height H. As an example, H may be in a range between 3 mm and 10 mm, for example, 5 mm. As an example, R may be in a range between 1 mm and 5 mm, for example, 2 mm. As an example, D2 may be in a range between 5 mm and 20 mm, for example, 9.7 mm. As an example, D1 may be in a range between 3 mm and 15 mm, for example, 6.7 mm. As the converging surfaces 21, 22, 23 have different focal points, the light that enters the light incident end 81 of the light guide device 80 will have more uniform distribution of intensity and direction. Thus, it is beneficial to enhance uniformity of the light intensity distribution of the light guide device 80, in particular, to enhance the light intensity distribution nearby the light incident end 81.

The term of "light guide device" means a device that can direct a transmission of light therein mainly by internally total reflection. It may have various shapes, for example, of cylinders (may be called as light guide rods), bars (may be called as light guide bars or lamp bars), plates (may be called as light guide plates), rings (may be called as light guide rings), and so on. Because the light guide device directs the light mainly by the internally total reflection, it has high optical efficiency and low optical loss. The light guide device 80 directs the light incident from the light incident end 81 of the light guide device 80 towards its light exit end. Thus, in the light guide device 80, it typically needs the incident light to satisfy the total reflection condition at a side surface 82 of the light guide device 80, however, some decoupling structures (such as micro protrusions) may be provided at certain positions where the light is desired to exit on the side surface 82, so as to destroy the total reflection condition to allow the light to exit at the specified positions.

An embodiment of the present application also provides a lighting and/or signaling apparatus, including the optical assembly 500 as described in any one of the above embodiments.

In the above embodiments of the present application, the number of the converging surfaces is exemplary. Two or more converging surfaces are applicable. Unless there is technical conflict, various forms of multi-focal converging portion 20, for example those with multiple focal points arranged in the same axis shown in FIG. 2 and FIG. 3, those with multiple focal points arranged in the same plane shown in FIG. 4 and FIG. 5, those with multiple focal points arranged in different planes shown in FIG. 6 and FIG. 7, may be combined with any examples of the light collimating portions 10, the reflector 60, the plurality of mirrors 70 and the light guide device 80, or the like given in the embodiments of the present application.

As an example, the light source 40 may include a white light LED or a monochromatic light LED. Alternatively, it may also be any other known light sources in the art, such as an incandescent lamp. As an example, the light collimating portion 10 and the multi-focal converging portion 20 may be made from transparent glass, resin or plastic materials, for example, PMMA (polymethyl methacrylate) or polycarbonate.

In the embodiments of the present application, the optical assembly 500 may be supported or suspended by any known suitable devices for holding optical elements, for example a supporting seat or a suspension arm.

The lighting and/or signaling apparatus according to embodiments of the present application may include any types of illumination lamps and/or signaling lamps for an automobile vehicle, for example, headlamps, central high mounted stop lamps, turn indicators, position lamps, rear stop lamps and so on. The lighting and/or signaling apparatus according to embodiments of the present application may also be used in any fields other than the vehicle lamps, for example, streetlamps, advertising lamps and so on.

The present disclosure has been explained with reference to drawings. However, the examples shown in drawings are intended to exemplarily illustrate the embodiments of the present application by way of examples, instead of limiting the present invention. Scales in the drawings are only provided by way of examples, and are not intended to limit the present invention.

Although some of embodiments according to a general concept of the present disclosure have been illustrated and explained, the skilled person in the art will understand that these embodiments may be modified without departing principles and spirits of the present disclosure. The scope of the prevent invention will be defined by the appended claims and equivalents thereof.

What is claimed is:

1. A light beam adjusting device comprising:
 a light collimating portion arranged to collimate a light beam; and
 a multi-focal converging portion arranged to converge the collimated light beam, the multi-focal converging portion comprising two or more converging surfaces,
 wherein at least two of the two or more converging surfaces have focal points separated spatially from each other.

2. The light beam adjusting device according to claim 1, wherein all of focal points of the two or more converging surfaces are arranged in the same axis (y) of the multi-focal converging portion.

3. The light beam adjusting device according to claim 2, wherein the two or more converging surfaces are arranged in sequence along a radial direction of the multi-focal converging portion.

4. The light beam adjusting device according to claim 3, wherein the light collimating portion and the multi-focal converging portion are formed integrally as one single part, and the light collimating portion is formed at a light incidence side of the single part and the multi-focal converging portion is formed at a light exit side of the single part.

5. The light beam adjusting device according to claim 2, wherein the light collimating portion and the multi-focal converging portion are formed integrally as one single part, and the light collimating portion is formed at a light incidence side of the single part and the multi-focal converging portion is formed at a light exit side of the single part.

6. The light beam adjusting device according to claim 2, wherein the light collimating portion comprises a first light incident face, a second light incident face and a totally reflective face, and wherein the first light incident face is arranged at an intermediate position of the light collimating portion to collimate a central portion of the light beam; the second light incident face is arranged outside the first light incident face in a radial direction to direct a peripheral portion of the light beam to the totally reflective face which is arranged outside the second light incident face in a radial direction to collimate the portion of the light beam incident from the second light incident face.

7. The light beam adjusting device according to claim 1, wherein all of focal points of the two or more converging surfaces are arranged in the same plane perpendicular to an axis (y) of the multi-focal converging portion.

8. The light beam adjusting device according to claim 7, wherein all of peaks of the two or more converging surfaces are arranged in the same plane perpendicular to the axis (y) of the multi-focal converging portion.

9. The light beam adjusting device according to claim 1, wherein all of focal points of the two or more converging surfaces are arranged in at least two different planes perpendicular to an axis (y) of the multi-focal converging portion respectively.

10. The light beam adjusting device according to claim 9, wherein all of peaks of the two or more converging surfaces are arranged in the at least two different planes perpendicular to the axis (y) of the multi-focal converging portion respectively.

11. The light beam adjusting device according to claim 1, wherein the light collimating portion and the multi-focal converging portion are formed integrally as one single part, and the light collimating portion is formed at a light incidence side of the single part and the multi-focal converging portion is formed at a light exit side of the single part.

12. The light beam adjusting device according to claim 11, further comprising a reflector arranged to reflect a light emitted from the two or more converging surfaces.

13. The light beam adjusting device according to claim 11, wherein the two or more converging surfaces are arranged at a side surface of the single part, and the single part further comprises a reflective face arranged to direct the light beam collimated by the light collimating portion to the two or more converging surfaces, the reflective face being arranged at a side of the single part opposite to the light collimating portion.

14. The light beam adjusting device according to claim 13, further comprising a plurality of mirrors arranged outside the side surface of the single part and arranged in sequence from near to far with respect to the side surface of the single part, to reflect the light beam converged by the two or more converging surfaces respectively.

15. The light beam adjusting device according to claim 1, wherein the light collimating portion comprises a first light incident face, a second light incident face and a totally reflective face, and wherein the first light incident face is arranged at an intermediate position of the light collimating portion to collimate a central portion of the light beam; the second light incident face is arranged outside the first light incident face in a radial direction to direct a peripheral portion of the light beam to the totally reflective face which is arranged outside the second light incident face in a radial direction to collimate the portion of the light beam incident from the second light incident face.

16. An optical assembly comprising:
a light source arranged to emit a light beam; and
a light beam adjusting device including:
 a light collimating portion arranged to collimate the light beam; and
 a multi-focal converging portion arranged to converge the collimated light beam, the multi-focal converging portion comprising two or more converging surfaces, wherein
 at least two of the two or more converging surfaces have focal points separated spatially from each other.

17. The optical assembly according to claim 16, further comprising a light guide device which has a light incidence end arranged toward the two or more converging surfaces and arranged to receive the light emitted from the two or more converging surfaces.

18. The optical assembly according to claim 16, wherein all of focal points of the two or more converging surfaces are arranged in the same axis (y) of the multi-focal converging portion.

19. An apparatus, comprising:
an illumination lamp or a signaling lamp; and
an optical assembly including:
 a light source arranged to emit a light beam, and
 a light beam adjusting device including:
  a light collimating portion arranged to collimate the light beam, and
  a multi-focal converging portion arranged to converge the collimated light beam, the multi-focal converging portion comprising two or more converging surfaces, wherein at least two of the two or more converging surfaces have focal points separated spatially from each other.

20. The apparatus according to claim 19, further comprising
a light guide device which has a light incidence end arranged toward the two or more converging surfaces and arranged to receive the light emitted from the two or more converging surfaces.

* * * * *